(12) United States Patent
Matsunuma (10) Patent No.: US 8,279,392 B2
(45) Date of Patent: Oct. 2, 2012

(54) LIQUID CRYSTAL DISPLAY PANEL, LIQUID CRYSTAL DISPLAY DEVICE HAVING THE SAME, AND METHOD OF MANUFACTURING THE SAME

(75) Inventor: Shigeo Matsunuma, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/731,742

(22) Filed: Mar. 25, 2010

(65) Prior Publication Data

US 2010/0177273 A1    Jul. 15, 2010

Related U.S. Application Data (63) Continuation of application No. PCT/JP2007/070916, filed on Oct. 26, 2007.

(51) Int. Cl.
*G02F 1/1345* (2006.01)
(52) U.S. Cl. ........................ 349/152; 349/187
(58) Field of Classification Search .......... 349/149–152, 349/158, 74, 187; 445/46
See application file for complete search history.

(56) References Cited

U.S. PATENT DOCUMENTS

| | | | | |
|---|---|---|---|---|
| 6,473,147 B1 * | 10/2002 | Nakahara et al. | ............. | 349/153 |
| 6,646,697 B1 * | 11/2003 | Sekiguchi et al. | ............. | 349/73 |
| 6,850,307 B2 * | 2/2005 | Hinata | ............. | 349/147 |
| 6,933,221 B1 * | 8/2005 | Jiang | ............. | 438/613 |
| 7,068,340 B2 * | 6/2006 | Yamate et al. | ............. | 349/152 |
| 7,868,989 B2 * | 1/2011 | Yokota | ............. | 349/152 |
| 2007/0279570 A1 * | 12/2007 | Ichikawa | ............. | 349/150 |
| 2008/0068315 A1 | 3/2008 | Kurosaki et al. | | |

FOREIGN PATENT DOCUMENTS

| | | |
|---|---|---|
| JP | 11-101984 A | 4/1999 |
| JP | 2001-91967 A | 4/2001 |
| JP | 2001-222022 A | 8/2001 |
| WO | 2006/100711 A1 | 9/2006 |

OTHER PUBLICATIONS

International Search Report of PCT/JP2007/070916, date of mailing Jan. 15, 2008.
International Search Report of PCT/JP2007/070916 mailing date Jan. 15, 2008.

* cited by examiner

*Primary Examiner* — Thoi Duong
(74) *Attorney, Agent, or Firm* — Westerman, Hattori, Daniels & Adrian, LLP (57) ABSTRACT

The invention relates to a liquid crystal display panel formed by enclosing a liquid crystal between a pair of substrates, a liquid crystal display device having the same, and a method of manufacturing the same. The liquid crystal display panel can be easily connected to a circuit board. The liquid crystal display panel includes a scan electrode substrate having a plurality of scan electrodes formed like strips extending in parallel, a data electrode substrate having a plurality of data electrodes formed like strips extending in parallel, and a plurality of connection terminals formed at one edge of the scan electrode substrate to provide electrical connection with the data electrodes.

20 Claims, 9 Drawing Sheets

LIQUID CRYSTAL DISPLAY PANEL, LIQUID CRYSTAL DISPLAY DEVICE HAVING THE SAME, AND METHOD OF MANUFACTURING THE SAME

This application is a continuation of International Application No. PCT/JP2007/070916, filed Oct. 26, 2007.

BACKGROUND OF THE INVENTION

1. Field of the Invention

The present invention relates to a liquid crystal display panel formed by enclosing a liquid crystal between a pair of substrates, a liquid crystal display device having the same, and a method of manufacturing the same.

2. Description of the Related Art

A display panel forming part of a multi-layer type reflective liquid crystal display element has a structure formed by, for example, enclosing a display material between a pair of resin film substrates which are disposed in an opposed manner. Such a display panel has connection terminals provided at edges of the resin film substrates to connect the panel to a circuit board.

Figure 8A:
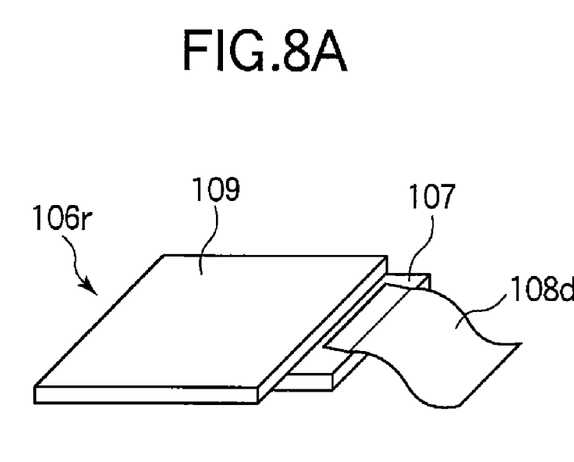
FIGS. 8A and 8B are illustrations for explaining a method of manufacturing a multi-layer liquid crystal display device according to the related art (I)

FIGS. 8A to 9B show a method of manufacturing a multi-layer type reflective color liquid crystal display device according to the related art. A liquid crystal display panel 106r for red (R) is fabricated by enclosing a cholesteric liquid crystal for red reflecting red (R) light between a pair of substrates, i.e., substrates 107 and 109 disposed opposite to each other. Next, as shown in FIG. 8A, an intermediate substrate 108d for connecting the R liquid crystal display panel 106r to the circuit board (not shown) is connected to connection terminals (not shown) exposed on one end of the substrate 107. A flexible printed circuit board (FPC) is used as the intermediate substrate 108d.

Figure 8B:
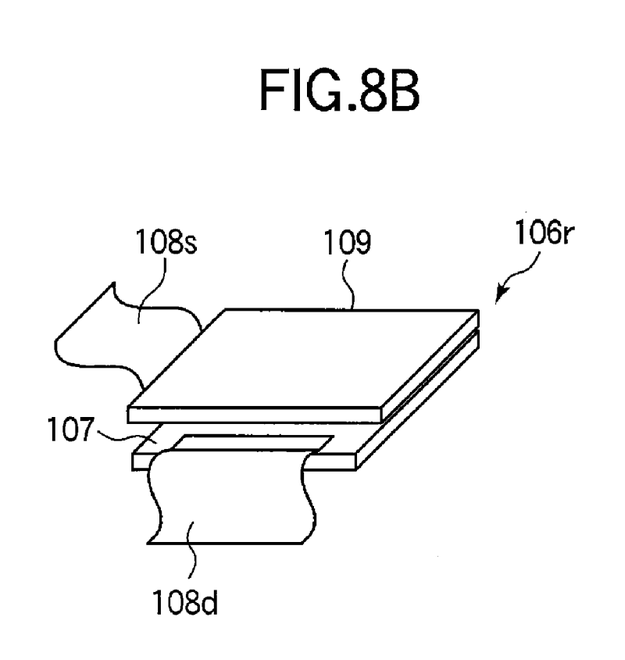

Next, as shown in FIG. 8B, an intermediate substrate 108s is connected to connection terminals (not shown) exposed on one end of the substrate 109. The connection terminals provided on the substrates 107 and 109 are formed on surfaces of the respective substrates 107 and 109 facing each other. Therefore, in order to mount the intermediate substrate 108s on the substrate 109, the R liquid crystal display panel 106r must be turned upside down after mounting the intermediate substrate 108d.

Figure 9A:
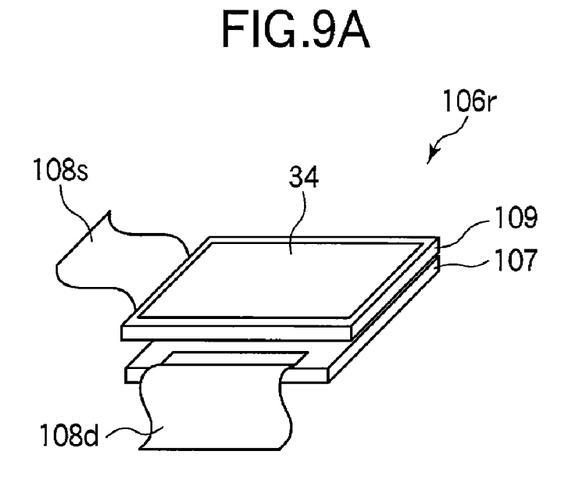
FIGS. 9A and 9B are illustrations for explaining the method of manufacturing a multi-layer liquid crystal display device according to the related art (II).

Next, a liquid crystal display panel 106g for green (G) is fabricated according to the same manufacturing method as for the R liquid crystal display panel 106r. The G liquid crystal display panel 106g is formed by enclosing a cholesteric liquid crystal for green reflecting green light between a pair of substrates, i.e., substrates 107 and 109. Next, as shown in FIG. 9A, an adhesive is applied to the substrate 109 of the R liquid crystal display panel 106r to form a bonding layer 34. Next, the G liquid crystal display panel 106g having intermediate substrates 108d and 108s connected thereto is secured on the R liquid crystal display panel 106r using the bonding layer 34. Although not shown, another bonding layer is formed on the substrate 109 of the G liquid crystal display panel 106g to secure a liquid crystal display panel 106b for blue (B) on the substrate, the B liquid crystal display panel having the same structure as that of the G and R liquid crystal display panels 106g and 106r and including a cholesteric liquid crystal for blue reflecting blue light enclosed therein.

Next, the intermediate substrates 108d and 108s of each of the B, G, and R liquid crystal display panels 106b, 106g, and 106r are connected to a circuit board which is not shown. Thus, a multi-layer type reflective color liquid crystal display device is completed.

Patent Document 1: International Publication No. 06/100711 Pamphlet

SUMMARY OF THE INVENTION

Figure 9B:
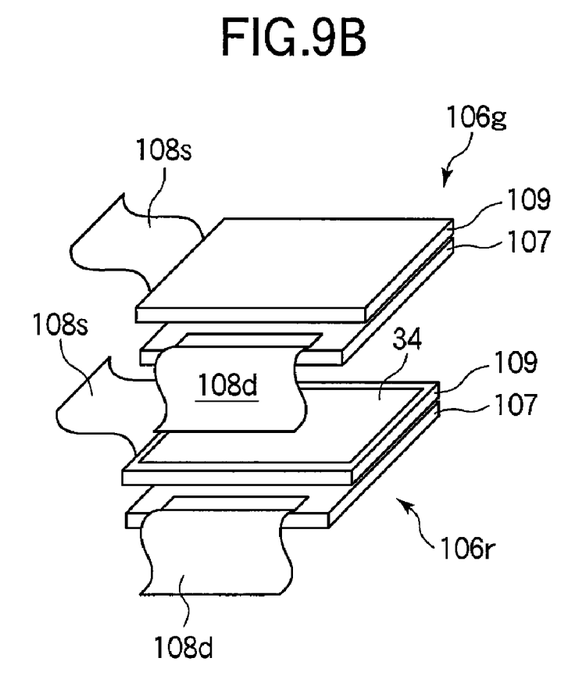

The reflective color liquid crystal display device has the capability of color display achieved by stacking the plurality of liquid crystal display panels which reflect light rays in different colors. Since the G and R liquid crystal display panels 106g and 106r having the same shape are stacked as shown in FIG. 9B, the terminals of the lower liquid crystal display panel 106r for red provided for connection with the circuit board are hidden by the upper liquid crystal display panel 106g for green. As a result, a problem arises in that a difficulty is encountered during the operation of mounting the intermediate substrates 108d and 108s for connecting the B, G, and R liquid crystal display panels 106b, 106g, and 106r to the circuit board.

A solution to the problem is to stack the G and R liquid crystal display panels 106g and 106r after mounting the intermediate substrates 108d and 108s on the G and R liquid crystal display panels 106g and 106r, as shown in FIGS. 8A to 9A. Another proposed approach is to form the liquid crystal display panels disposed as the upper and lower layers such that they are different from each other in terms of the position where the respective connection terminals are formed. However, the connection terminals on the substrate 107 and the connection terminals on the substrate 109 are formed on the surfaces of the respective substrates which are opposite to each other. Therefore, either of the methods results in a need for turning each of the B, G, and R liquid crystal display panels 106b, 106b, and 106r upside down at the step of mounting the intermediate substrate. Such turning operations can reduce the productivity of multi-layer liquid crystal device on a mass production basis. There is another problem in that the intermediate substrates can degrade the efficiency of the operation of stacking liquid crystal display panels. For such reasons, it is desirable to provide a multi-layer structure and a manufacturing method which allow liquid crystal display panels and a circuit board to be easily connected after the liquid crystal display panels are stacked.

It is an object of the invention to provide a liquid crystal display panel which can be easily connected to a circuit board, a liquid crystal display device having the same, and a method of manufacturing the same.

The above-described object is achieved by a liquid crystal display panel including a first substrate including a first electrode and a second substrate including a second electrode formed opposite to each other to sandwich a liquid crystal layer, wherein a terminal for electrically connecting the first electrode and the second electrode is formed on either the second substrate or the first substrate.

The above-described object is achieved by a liquid crystal display device including a liquid crystal display panel provided on a circuit board, the liquid crystal display panel having a first substrate including a first electrode and a second substrate including a second electrode formed opposite to each other to sandwich a liquid crystal layer and a terminal formed on either the second substrate or the first substrate to connect the first electrode and the second electrode electrically, wherein the terminal and the circuit board are electrically connected to each other.

The above-described object is achieved by a liquid crystal display device including a plurality of liquid crystal display panels stacked one over another and disposed on a circuit board, the liquid crystal display panels having a first substrate including a first electrode and a second substrate including a second electrode formed opposite to each other to sandwich a liquid crystal layer and a terminal formed on either the second substrate or the first substrate of each liquid crystal display panel to connect the first electrode and the second electrode electrically, wherein the terminal of each liquid crystal display panel and the circuit board are electrically connected to each other.

The above-described object is achieved by a method of manufacturing a liquid crystal display device including the steps of forming a first electrode and a terminal electrically isolated from the first electrode on a first substrate and forming a second electrode on a second substrate, electrically connecting the second electrode and the terminal with the first electrode and the second electrode disposed to face each other and electrically connecting the terminal to a circuit board.

The above-described object is achieved by a method of manufacturing a liquid crystal display device including the steps of forming a first electrode and a terminal electrically isolated from the first electrode on a first substrate and forming a second electrode on a second substrate, combining the first substrate and the second substrate such that the first electrode and the second electrode face each other and electrically connecting the second electrode and the terminal to fabricate a liquid crystal display panel and stacking a plurality of the liquid crystal display panels one over another and disposing them on a circuit board and electrically connecting the terminal of each of the plurality of liquid crystal display panels to the circuit board.

The invention makes it possible to provide a liquid crystal display panel which can be easily connected to a circuit board and a liquid crystal display device having the same.

DESCRIPTION OF THE PREFERRED EMBODIMENTS

Figure 1A:
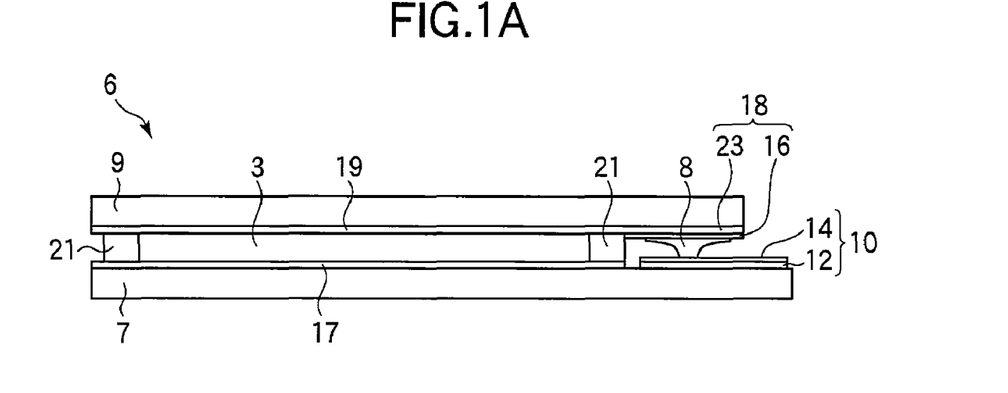
FIGS. 1A and 1B are illustrations showing a schematic configuration of a liquid crystal display panel 6 according to an embodiment of the invention.
Figure 1B:
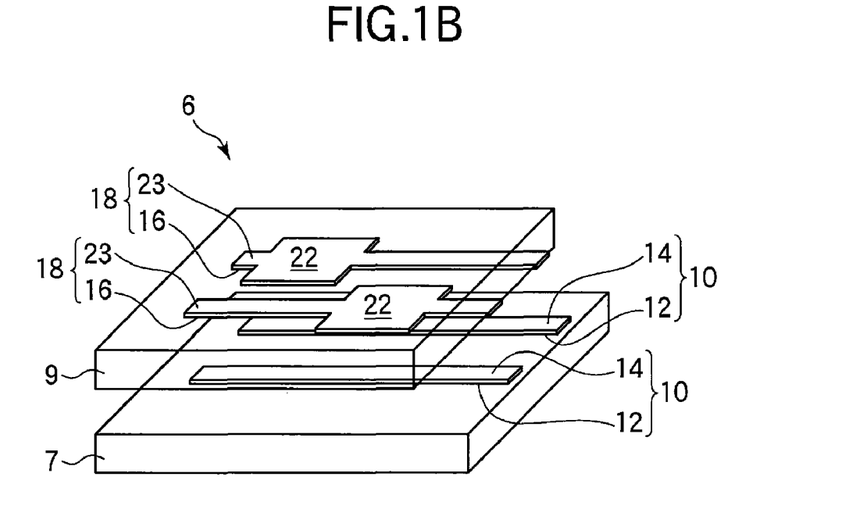
Figure 2A:
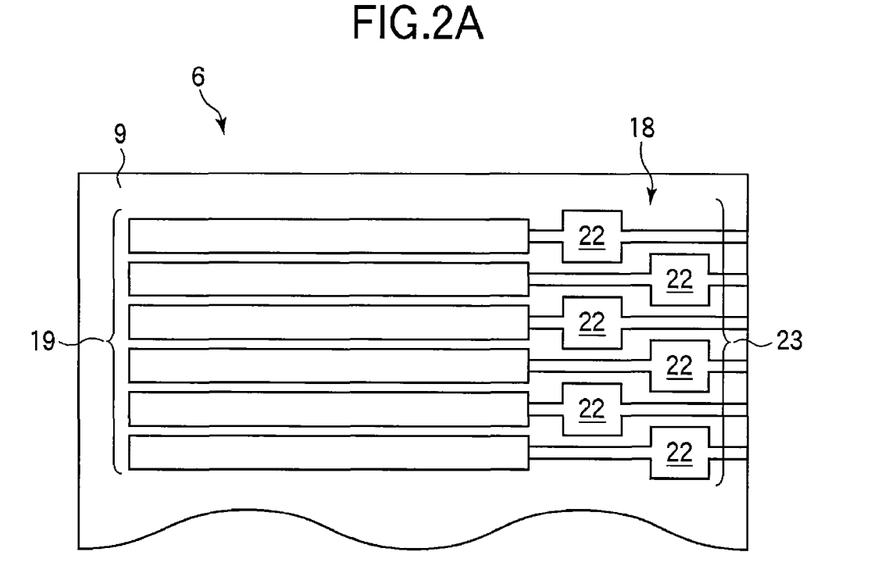
FIGS. 2A and 2B are exploded views of the liquid crystal display panel 6 according to the embodiment of the invention.
Figure 2B:
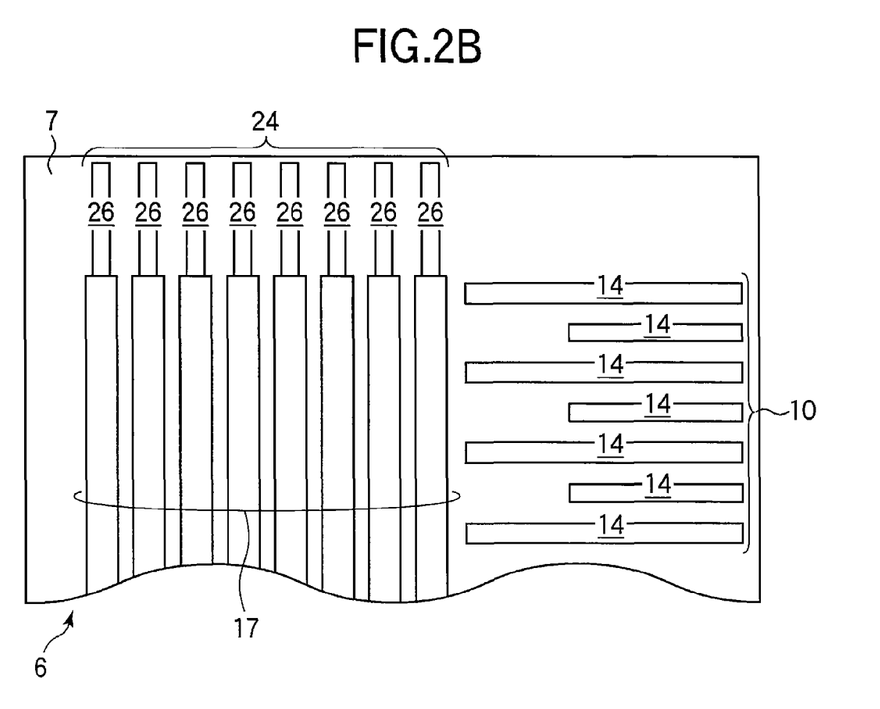

A liquid crystal display panel, a liquid crystal display device having the same, and a method of manufacturing the same according to a first embodiment of the invention will now be described with reference to FIGS. 1A to 7C. First, a schematic configuration of a liquid crystal display panel 6 according to the present embodiment will be described with reference to FIGS. 1A to 2B. FIGS. 1A and 1B show a schematic configuration of the liquid crystal display panel 6 according to the present embodiment. FIG. 1A shows a sectional configuration of the liquid crystal display panel 6, and FIG. 1B is a perspective view of the liquid crystal display panel 6 showing major parts thereof provided at ends of substrates. Conductive connecting portions 8 are omitted in FIG. 1B. FIGS. 2A and 2B are exploded views of the liquid crystal display panel 6. FIG. 2A shows a bottom surface of a data electrode substrate 9 having data electrodes 19 formed thereon, and FIG. 2B shows a surface of a scan electrode substrate 7 having scan electrodes 17 formed thereon.

As shown in FIGS. 1A to 2B, the liquid crystal display panel 6 has a structure provided by forming the scan electrode substrate (first substrate) 7 having a plurality of strip-like scan electrodes (first electrodes) 17 formed in parallel and the data electrode substrate (second substrate) 9 having a plurality of strip-like data electrodes (second electrodes) 19 formed in parallel such that the substrates face each other with a liquid crystal layer 3 interposed between them. The scan electrodes 17 and the data electrodes 19 are disposed on the opposite surfaces such that they extend across each other. Each of regions where the electrodes 17 and 19 intersect constitutes a pixel (not shown). The pixels are arranged in the form of a matrix to constitute a display screen. The liquid crystal display panel 6 has an XY matrix electrode configuration. Reference numeral 17 in FIG. 1A represents the region where the plurality of scan electrodes 17 are provided.

The scan electrode substrate 7 and the data electrode substrate 9 are combined with each other by a seal material 21 formed like a frame extending along the peripheries of the substrates 7 and 9. The liquid crystal layer 3 is enclosed between the substrates 7 and 9 inside the seal material 21. The liquid crystal layer 3 includes a cholesteric liquid crystal having an average refractive index n and a helical pitch p adjusted such that light rays having predetermined wavelength are selectively reflected.

The liquid crystal display panel 6 also includes a plurality of connection terminals 10 which are formed on the scan electrode substrate 7 at one edge thereof to electrically connect the substrate to the data electrodes 19. The connection electrodes 10 are formed in electrical isolation from the scan electrodes 17. The connection terminals 10 are formed to extend in a direction substantially orthogonal to the extending direction of the scan electrodes 17. The connection terminals 10 are formed in the same number as the data electrodes 19. The connection terminals 10 include a bottom electrode 12 which is formed from the same material as the scan electrodes 17 at the same time when the electrodes are formed to belong to the same layer that the electrodes constitute, the connection terminals also including a conductor layer 14 formed on the bottom electrode 12. While the connection terminals 10 of the present embodiment are formed on the scan electrode substrate 7, the terminals may alternatively be formed on the data electrode substrate 9 to provide electrical connection to the scan electrodes 17.

The data electrode substrate 9 includes connection pad portions 18 disposed to face the plurality of connection terminals 10 respectively. The connection pad portions 18 include lead-out electrode parts 23 formed by extending respective data electrodes 19 up to one edge of the data electrode substrate 9, and the substrate also includes a conductor layer 16 formed on the lead-out electrode part 23. Each connection pad portions 18 includes a bonding part 22 which is formed wider than other regions of the portion. The area of the regions of the connection pad portions 18 facing the connection terminals 10 is thus increased by the bonding parts 22, and sufficient electrical connection can therefore be provided between the connection pad portions 18 and the connection terminals 10. The plurality of bonding parts 18 are staggered when viewed in the normal direction of the substrate surfaces of the data electrode substrate 9. Thus, the connection pad portions 18 can be disposed on imaginary straight lines extending from the respective data electrodes 19.

The liquid crystal display panel 6 includes conductive connecting portions 8 which are formed between the substrates 7 and 9 to connect either the scan electrodes 17 or data electrodes 19 to the connection terminals 10 (the data electrodes 19 are connected in the present embodiment). As will be described later with reference to FIGS. 5, 6A and 6B, at the conductive connecting portions 8, bonding material 8a formed on the connection pad portions 18 is melted to provide inter-layer connection between the connection pad portions 18 and the connection terminals 10.

As shown in FIG. 2B, the scan electrode substrate 7 has lead-out terminals 24 formed to extend from the plurality of scan electrodes 17 respectively. A lead-out terminal 24 is formed at one end of each of the plurality of scan electrodes 17. The lead-out terminals 24 are disposed at another edge of the scan electrode substrate 7 orthogonal to the edge at which the connection terminals 10 are disposed. The lead-out terminals 24 have a bottom electrode (not shown) formed from the same material as the scan electrodes 17 at the same time when the electrodes are formed to belong to the same layer that the electrodes constitute, and the terminals also have conductor layers 26 formed on the bottom electrodes. The conductor layers 26 are formed from the same material as the conductor layers 14 of the connection terminals 10 at the same time when the layers 14 are formed.

Either the scan electrode substrate 7 or the data electrode substrate 9 on which the connection terminals 10 are formed has a size greater than the size of the other substrate. In the present embodiment, since the connection terminals 10 are formed on the scan electrode substrate 7, the scan electrode substrate 7 is formed greater than the data electrode substrate 9. As a result, the connection terminals 10 and the lead-out terminals 24 are exposed at an end of the liquid crystal display panel 6. Further, the connection terminals 10 and the lead-out terminals 24 are exposed to face toward the data electrode substrate 9. Thus, the liquid crystal display panel 6 has a structure which allows the circuit connection terminals to be accessed at one side of the panel. As a result, intermediate substrates can be easily connected to such liquid crystal display panels 6 without turning the panels upside down. Therefore, steps of manufacturing a liquid crystal display device having liquid crystal display panels 6 can be simplified, and improved yield of manufacture can be achieved, as will be described later.

Figure 5:
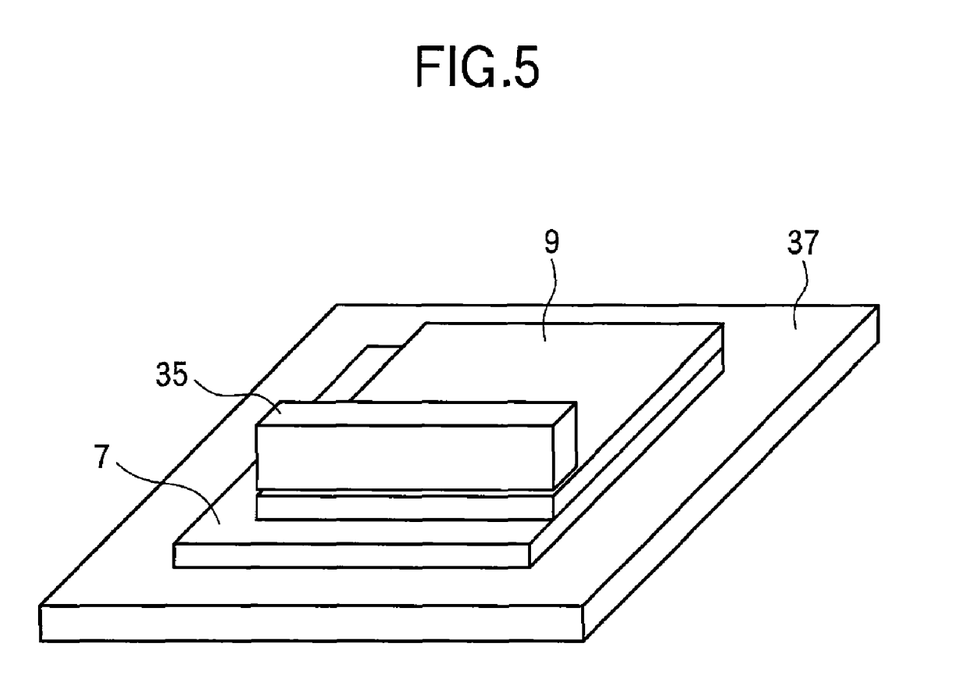
FIG. 5 is an illustration for explaining the method of manufacturing a liquid crystal display device according to the embodiment of the invention (III)
Figure 6A:
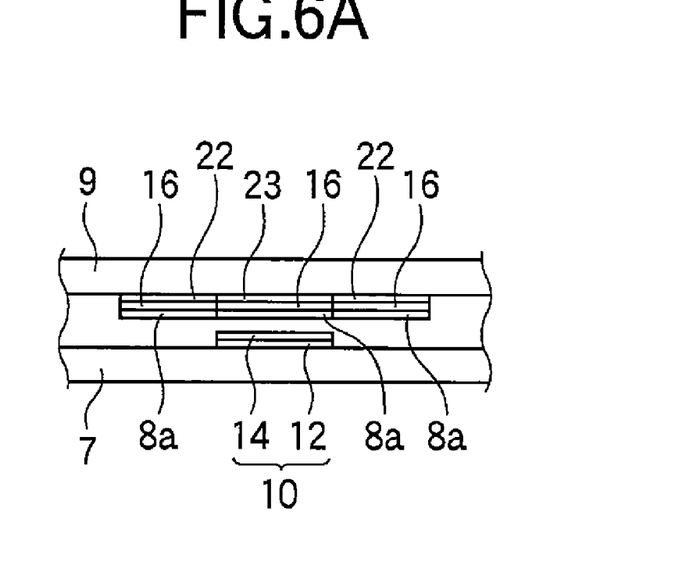
FIGS. 6A and 6B are illustrations for explaining the method of manufacturing a liquid crystal display device according to the embodiment of the invention (IV)
Figure 6B:
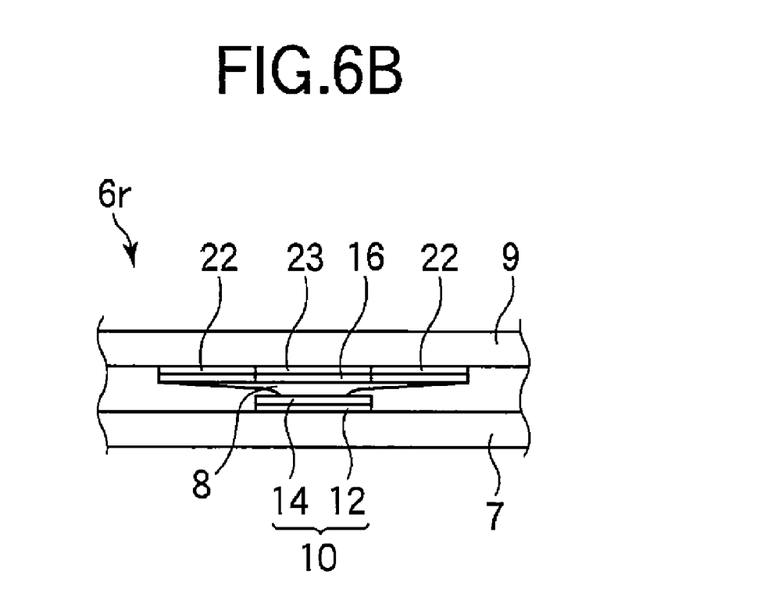
Figure 7A:
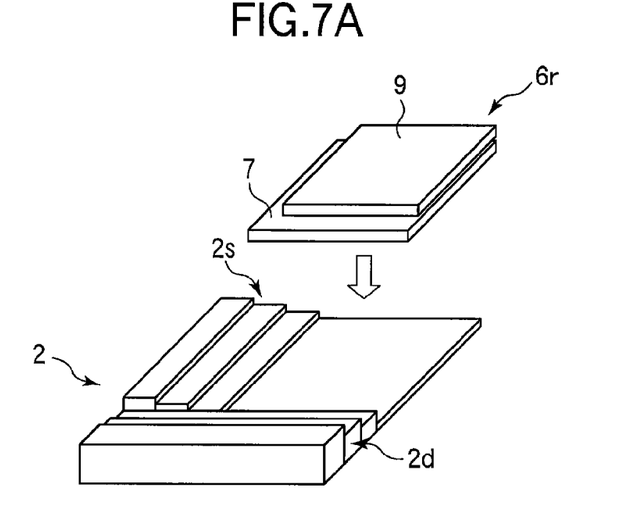
FIGS. 7A to 7C are illustrations for explaining the method of manufacturing a liquid crystal display device according to the embodiment of the invention (V)
Figure 7B:
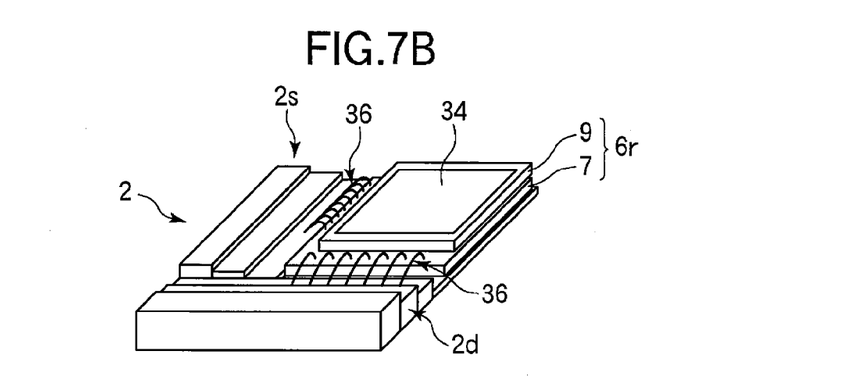
Figure 7C:
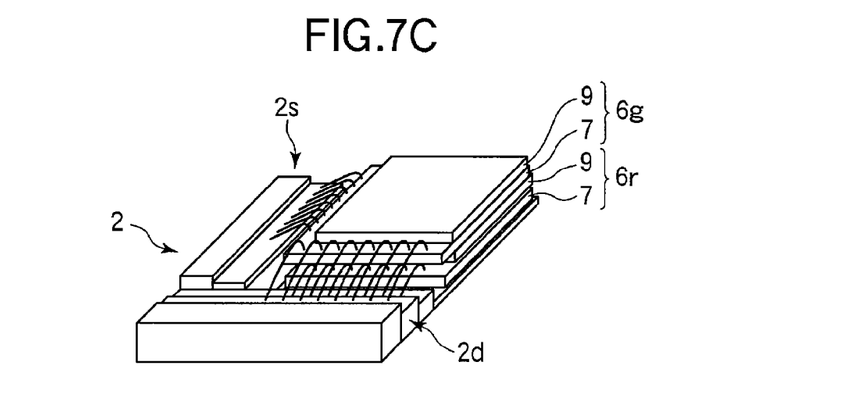

A method of manufacturing a liquid crystal display device according to the present embodiment will now be described with reference to FIGS. 3A to 7C. FIGS. 3A to 4F are sectional views showing steps of fabricating connection pad portions 18 of a liquid crystal display panel 6. FIGS. 5, 6A, and 6B are illustrations for explaining a step of heating and pressing the connection pad portions 18. FIGS. 7A, 7B, and 7C are illustrations for explaining a step of connecting the liquid crystal display panels with a circuit board.

Figure 3A:
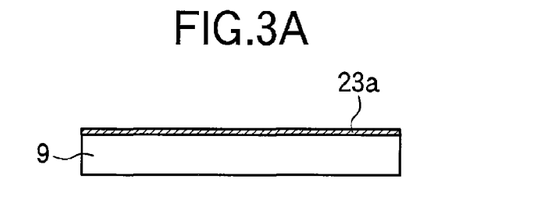
FIGS. 3A to 3E are illustrations for explaining a method of manufacturing a liquid crystal display device according to the embodiment of the invention (I)

As shown in FIG. 3A, a transparent electrode film 23a of indium tin oxide (ITO) or indium zinc oxide (IZO) is formed on a data electrode substrate 9 constituted by, for example, a polycarbonate (PC) film.

Figure 3B:
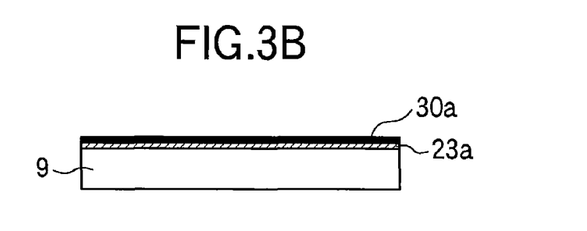
Figure 3C:
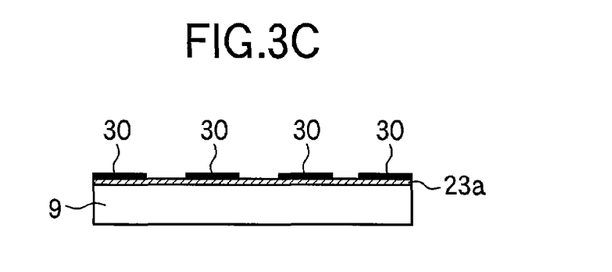
Figure 3D:
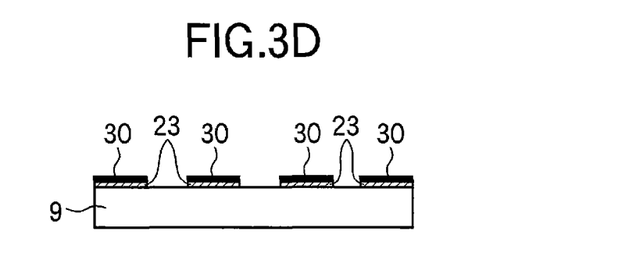
Figure 3E:
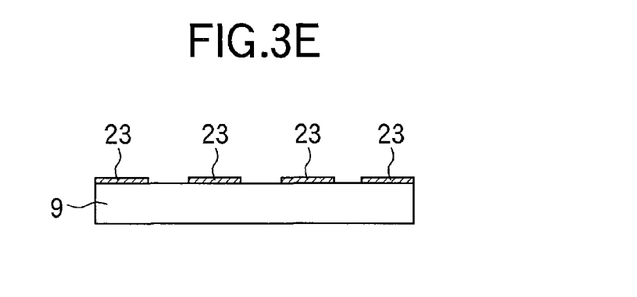

Next, a resist 30a is applied to the entire top surface of the transparent electrode film 23a as shown in FIG. 3B. Next, as shown in FIG. 3C, the resist 30a is exposed and developed to form a resist pattern 30 such that the resist 30a remains in regions where data electrodes 19 (not shown in FIG. 3C) and connection pad portions 18 will be formed later. The transparent conductive film 23a is then etched using the resist pattern 30 as a mask as shown in FIG. 3D. Next, as shown in FIG. 3E, the resist pattern 30 is removed to form data electrodes 19 (not shown) and lead-out electrode parts 23. The data electrodes 19 are formed with a width of about 0.2 mm (millimeters) at a pitch of about 0.24 mm.

Figure 4A:
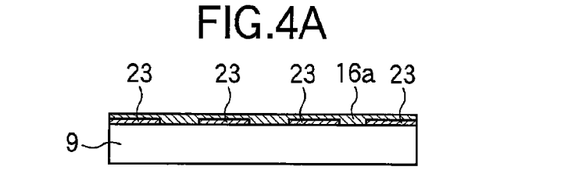
FIGS. 4A to 4F are illustrations for explaining the method of manufacturing a liquid crystal display device according to the embodiment of the invention (II)
Figure 4B:
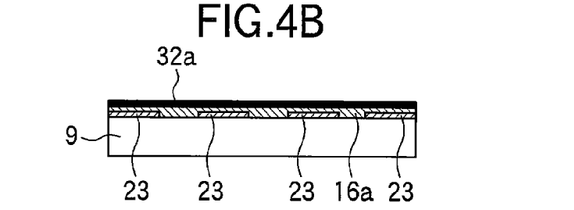
Figure 4C:
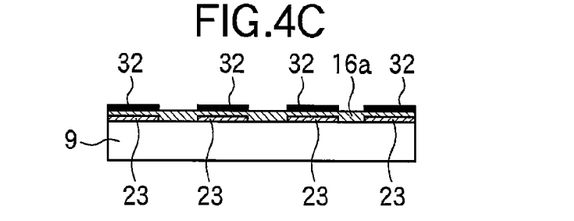

Next, as shown in FIG. 4A, a metal film 16a is made of copper using, for example, a sputtering process in the regions of the data electrode substrate 9 where the lead-out electrode parts 23 are to be formed. A resist 32a is then applied to the entire top surface of the metal film 16a as shown in FIG. 4B. Next, as shown in FIG. 4C, the resist 32a is exposed and developed to form a resist pattern 32 such that the resist 32a remains in regions where connection pad portions 18 will be formed later.

Figure 4D:
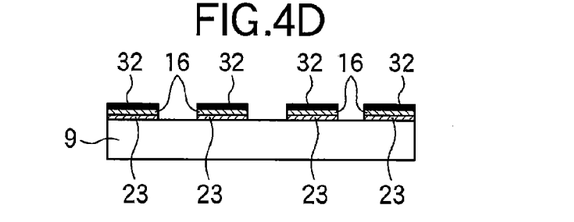
Figure 4E:
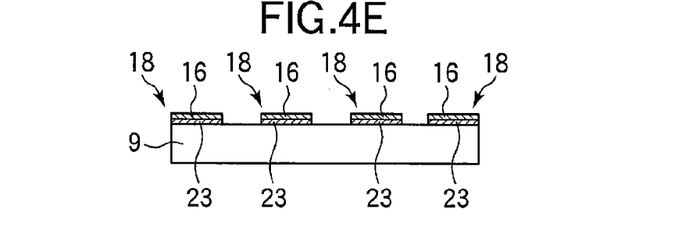

The metal film 16a is then etched using the resist pattern 32 as a mask as shown in FIG. 4D. Next, as shown in FIG. 4E, the resist pattern 32 is removed to form conductor layers 16 on the lead-out electrode parts 23. Thus, connection pad portions 18 are completed.

Figure 4F:
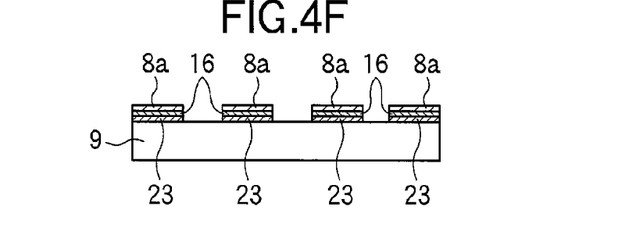

Next, as shown in FIG. 4F, a connection material 8a which is made of a soldering material including either Sn, Ag or Bi is provided on the connection pad portions 18 using, for example, a plating process. A data electrode substrate 9 according to this embodiment is somewhat limited in anti-heat performance because it is a film substrate. For this reason, a low-temperature type soldering material to be used at a temperature in the range of, for example, about 130° C. to about 140° C. is used as the connection material 8a. A data electrode substrate 9 is completed as thus described. Next, a scan electrode substrate 7 is fabricated. Connection terminals 10 and lead-out terminals 24 of the scan electrode substrate 7 are formed using steps similar to those taken to form the connection pad portions 18. At this time, scan electrodes 17 and the connection terminals 10 are formed in electrical isolation from each other.

Next, the substrates 7 and 9 are combined with each other (see FIGS. 1A and 1B) such that the scan electrodes 17 and the data electrodes 19 face each other in an intersecting relationship and such that each of the connection terminals 10 and the lead-out terminals 24 formed on the scan electrode substrate 7 is partially exposed. The substrates 7 and 9 are combined with each other by a seal material 21. A cholesteric liquid crystal is injected between the substrates 7 and 9, and the injection port is sealed. The average refractive index n of the cholesteric liquid crystal and the helical pitch p of the liquid crystal molecules are adjusted, for example, such that red light is reflected.

Next, as shown in FIG. 5, the stack of the substrates 7 and 9 having the liquid crystal enclosed therein is placed on a stage 37 with the scan electrode substrate 7 located at the bottom, and a heating/pressing head 35 is then placed on the region of the data electrode substrate 9 where the connection pad portions 18 are formed.

Next, in the region of the connection pad portions 18, the stack of the substrates 7 and 9 is heated and pressed from both sides by the stage 37 and the heating/pressing head 35. As shown in FIG. 6A, each connection pad portion 18 has a bonding part 22 formed wider than other regions of the portion. Therefore, when the connecting material 8a is melted by the heating/pressing head 35, the thickness of the connecting material 8a is increased by surface tension. Thus, the connecting material 8a is melted to form conductive connecting portions 8, whereby the connection terminals 10 and the connection pad portions 18 are connected. As a result, the connection terminals 10 are electrically connected to the data electrodes 19 through the conductive connecting portions 8. Thus, a liquid crystal display panel 6r for red (R) reflecting red light is completed.

Next, as shown in FIG. 7A, the R liquid crystal display panel 6r is placed on a driving circuit board 2. The driving circuit board 2 for driving the multi-layer type liquid crystal display device of the present embodiment includes step-like connecting portions 2d and 2s which are connected to the connection terminals 10 and the lead-out terminals 24 (not shown in FIGS. 7A, 7B, and 7C), respectively.

Next, as shown in FIG. 7B, wire bonding is performed to connect the connection terminals 10 and the connecting portion 2d constituting the lowermost step using connecting wires 36 and to connect the lead-out terminals 24 and the connecting portion 2s constituting the lowermost step using connecting wires 36. A single-layered liquid crystal display device capable of monochromatic display is completed by the above-described manufacturing steps. It is not essential that the driving circuit board used for the single-layered liquid crystal display device includes the step-like connecting portions.

For example, a liquid crystal display panel 6g for green (G) selectively reflecting green light is fabricated using the same manufacturing method as for the R liquid crystal display panel 6r. The G liquid crystal display panel 6g includes a cholesteric liquid crystal having an average refractive index n and helical pitch p of liquid crystal molecules adjusted to reflect green light selectively.

Next, as shown in FIG. 7B, an adhesive is applied to the data electrode substrate 9 of the R liquid crystal display panel 6r to form an adhesive layer 34. A scan electrode substrate 7 of the G liquid crystal display panel 6g is then placed on the data electrode substrate 9 of the R liquid crystal display panel 6r. Next, the G and R liquid crystal display panels 6g and 6r thus stacked are secured to each other using the adhesive layer 34. Wire bonding is then performed to connect connection terminals 10 and the connecting portion 2d constituting the middle step using connecting wires 36 and to connect lead-out terminals 24 and the connecting portion 2s constituting the middle step using connecting wires 36.

Although not shown, a liquid crystal display panel 6b for blue (B) including a cholesteric liquid crystal having an average refractive index n and helical pitch p of liquid crystal molecules adjusted to reflect blue light selectively is then fabricated using the same manufacturing method as for the R liquid crystal display panel 6r. Next, an adhesive is applied to a data electrode substrate 9 of the G liquid crystal display panel 6g to form an adhesive layer. A scan electrode substrate 7 of the B liquid crystal display panel 6b is then placed on the data electrode substrate 9 of the G liquid crystal display panel 6g. Next, the B, G, and R liquid crystal display panels 6b, 6g, and 6r thus stacked are secured to each other using the adhesive layer. Wire bonding is then performed to connect connection terminals 10 of the B liquid crystal display panel 6b and the connecting portion 2d constituting the uppermost step using connecting wires 36 and to connect lead-out terminals 24 of the B liquid crystal display panel 6b and the connecting portion 2s constituting the uppermost step using connecting wires 36. Thus, a multi-layer type liquid crystal display device capable of full-color display is completed.

As described above, the connection terminals 10 and the lead-out terminals 24 of the B, G, and R liquid crystal display panels 6b, 6g, and 6r of the present embodiment are formed on surfaces of the scan electrode substrates 7 facing the data electrode substrates 9. Thus, the connecting wires 36 can be led out from a surface of one of respective pairs of substrates of the B, G, and R liquid crystal display panels 6b, 6g, and 6r to be connected to the connecting portions 2d and 2s of the driving circuit board 2. As a result, the liquid crystal display panels and the driving circuit board can be connected after the liquid crystal display panels are stacked. The B, G, and R liquid crystal display panels 6b, 6g, and 6r and the driving circuit board 2 can be connected without turning the B, G, and R liquid crystal display panels 6b, 6g, and 6r upside down. Thus, there is no need for a turning machine for turning the B, G, and R liquid crystal display panels 6b, 6g, and 6r upside down, and automation of manufacturing steps is facilitated. Unlike the related art, no intermediate substrate is connected to a liquid crystal display panel (the display panel corresponds to, for example, the G liquid crystal panel 6g shown in FIG. 7C) stacked on another liquid crystal display panel. There is no member which can hinder the stacking of the B, G, and R liquid crystal display panels 6b, 6g, and 6r, and a resin to serve as the adhesive layers can be easily applied to the G and R liquid crystal display panel 6g and 6r.

Unlike configurations in which connection terminals are led out in different positions as seen in the related art, the embodiment allows a reduction in man-hour required at manufacturing steps because the liquid crystal display panels can be made identical in shape. Further, the connection terminals can be processed at a time using the photolithographic or sputtering process. Therefore, the connecting step can be carried out with ease of operation higher than that provided by the method in which data electrodes or scan electrodes are connected to connection terminals by forming a connecting material on one side of a pair of substrates facing each other or the method in which data electrodes or scan electrodes are connected to connection terminals by forming through holes extending between surfaces of a pair of substrates facing each other. Further, since the connection step can be carried out with ease, connection terminals at a smaller pitch required for a display section having a higher definition can be properly processed.

The invention is not limited to the above-described embodiment and may be modified in various ways. While the liquid crystal display panels of the above-described embodiment are connected to the driving circuit board using wire bonding, the invention is not limited to such a process. For example, the same advantages as described above can be achieved by connecting the liquid crystal display panels to the driving circuit board using FPCs.

While the connection pad portions 18 of the above-described embodiment are heated from the side of the data electrode substrate 9, the invention is not limited to such a process. Obviously, the connection pad portions 18 may be heated from both sides, i.e., the substrate 7 side and the substrate 9 side of the panel.

The invention may be applied to display panels having scan electrodes and data electrodes disposed opposite to each other and to display device having such display panels.

What is claimed is:

1. A liquid crystal display panel, comprising:
a first substrate including a plurality of first electrodes and a second substrate including a plurality of second electrodes formed opposite to each other to sandwich a liquid crystal layer, wherein
a first terminal that is linearly formed and a second terminal that is linearly formed for electrically connecting either the first electrodes or the second electrodes is formed on either the second substrate or the first substrate;
the first terminal is longer than the second terminal;
connection pad portions are disposed to face the first and second terminals respectively, are connected to either the first electrode or the second electrode and are formed on either the first substrate or the second substrate, wherein the connection pad portions have a bonding part that is formed wider than other regions thereof; and
the bonding part is formed on the same layer as the connection pad portion.

2. The liquid crystal display panel according to claim 1, wherein either of the first substrate and the second substrate having the first and second terminals formed thereon has a size greater than a size of the other substrate.

3. The liquid crystal display panel according to claim 1, further comprising a conductive connecting portion formed between the first and second substrates to connect either the first electrodes or the second electrodes to the first and second terminals.

4. A liquid crystal display device comprising:
a liquid crystal display panel provided on a circuit board, the liquid crystal display panel having a first substrate including a plurality of first electrodes and a second substrate including a plurality of second electrodes formed opposite to each other to sandwich a liquid crystal layer;
a first terminal and a second terminal formed on either the second substrate or the first substrate to connect either the first electrodes or the second electrodes electrically; and
connection pad portions disposed to face the first and second terminals respectively, connected to either the first electrode or the second electrode, and formed on either the first substrate or the second substrate, wherein the connection pad portion have a bonding part that is formed wider than other regions thereof, wherein
the bonding part is formed on a same layer as the connection pad portion;
the first terminal is linearly formed and the second terminal is linearly formed;
the first terminal is longer than the second terminal; and
the first and second terminals and the circuit board are electrically connected to each other.

5. The liquid crystal display device according to claim 4, wherein the first and second terminals and the circuit board are connected using wire bonding.

6. The liquid crystal display device according to claim 4, wherein either of the first substrate and the second substrate having the first and second terminals formed thereon has a size greater than a size of the other substrate.

7. The liquid crystal display device according to claim 4, further comprising a conductive connecting portion formed between the first and second substrates to connect either the first electrodes or the second electrodes to the first and second terminals.

8. A liquid crystal display device comprising:
a plurality of liquid crystal display panels stacked one over another and disposed on a circuit board, the liquid crystal display panels having a first substrate including a plurality of first electrodes and a second substrate including a plurality of second electrodes formed opposite to each other to sandwich a liquid crystal layer;
a first terminal and a second terminal formed on either the second substrate or the first substrate of each liquid crystal display panel to connect either the first electrodes or the second electrodes electrically; and
connection pad portions disposed to face the first and second terminals respectively, connected to either the first electrode or the second electrode and formed on either the first substrate or the second substrate, wherein the connection pad portion have a bonding part that is formed wider than other regions thereof, wherein
the bonding part is formed on a same layer as the connection pad portion
the first terminal is linearly formed and the second terminal is linearly formed;
the first terminal is longer than the second terminal; and
the first and second terminals of each liquid crystal display panel and the circuit board are electrically connected to each other.

9. The liquid crystal display device according to claim 8, wherein the first and second terminals and the circuit board are connected using wire bonding.

10. The liquid crystal display device according to claim 8, wherein either of the first substrate and the second substrate having the first and second terminals formed thereon has a size greater than a size of the other substrate.

11. A method of manufacturing a liquid crystal display device, comprising the steps of:
forming a plurality of first electrodes and a first terminal that is linearly formed a second terminal that is linearly formed electrically isolated from the first electrodes on a first substrate and forming a plurality of second electrodes and connection pad portions connected to the second electrode on a second substrate, wherein the first terminal is longer than the second terminal, and the connection pad portions have a bonding part that is formed wider than other regions thereof, and the bonding part is formed on a same layer as the connection pad portion;
electrically connecting the second electrodes and the first and second terminals with the first electrodes and the second electrodes disposed to face each other and the first and second terminals and the connection pad portions disposed to face each other; and
electrically connecting the first and second terminals to a circuit board.

12. The method according to claim 11, wherein the first and second terminals and the second electrodes are electrically connected by a bonding material at an end of each of the second electrodes.

13. The method according to claim 12, wherein the bonding material is a soldering material.

14. The method according to claim 13, wherein the soldering material includes any of Sn, Ag, and Bi.

15. The method according to claim 11, wherein the first and second terminals and the circuit board is connected using wire bonding.

16. The method according to claim 11, wherein the first substrate having the first and second terminals formed thereon is formed greater than the second substrate.

17. A method of manufacturing a liquid crystal display device, comprising the steps of:
forming a plurality of first electrodes and a first terminal that is linearly formed and a second terminal that is linearly formed electrically isolated from the first electrodes on a first substrate and forming a plurality of second electrodes and connection pad portions connected to the second electrode on a second substrate, wherein the first terminal is longer than the second terminal and the connection pad portions have a bonding part that is formed wider than other regions thereof, and the bonding part is formed on a same layer as the connection pad portion;

combining the first substrate and the second substrate such that the first electrodes and the second electrodes face each other and the first and second terminals and the connection pad portions face each other and electrically connecting the second electrodes and the first and second terminals to fabricate a liquid crystal display panel; and stacking a plurality of the liquid crystal display panels one over another and disposing them on a circuit board and electrically connecting the first and second terminals of each of the plurality of liquid crystal display panels to the circuit board.

18. The method according to claim 17, wherein the first and second terminals and the second electrodes are electrically connected by a bonding material at an end of each of the second electrodes.

19. The method according to claim 17, wherein the first and second terminals and the circuit board is connected using wire bonding.

20. The method according to claim 17, wherein the first substrate having the first and second terminals formed thereon is formed greater than the second substrate.

* * * * *